(12) United States Patent
Kawai et al.

(10) Patent No.: US 8,480,989 B2
(45) Date of Patent: Jul. 9, 2013

(54) HOLLOW FINE PARTICLES, PRODUCTION PROCESS THEREOF, COATING COMPOSITION AND ARTICLE HAVING COATING FILM FORMED

(75) Inventors: Yohei Kawai, Chiyoda-ku (JP); Takashige Yoneda, Chiyoda-ku (JP)

(73) Assignee: Asahi Glass Company, Limited, Tokyo (JP)

(*) Notice: Subject to any disclaimer, the term of this patent is extended or adjusted under 35 U.S.C. 154(b) by 851 days.

(21) Appl. No.: 12/560,020

(22) Filed: Sep. 15, 2009

(65) Prior Publication Data
US 2010/0000443 A1 Jan. 7, 2010

Related U.S. Application Data (63) Continuation of application No. PCT/JP2008/054796, filed on Mar. 14, 2008.

(30) Foreign Application Priority Data

Mar. 16, 2007 (JP) .................. 2007-068595

(51) Int. Cl.
*C01B 33/113* (2006.01)
*C01B 33/12* (2006.01)
*C01B 33/152* (2006.01)
*C01B 33/154* (2006.01)
*C01P 2004/64* (2006.01)
*C08K 3/36* (2006.01)

(52) U.S. Cl.
USPC ....... 423/335; 423/338; 423/339; 106/287.34

(58) Field of Classification Search
USPC ... 106/286.1, 287.34, 481; 424/724; 428/402, 428/403; 423/335, 338–339
See application file for complete search history.

(56) References Cited

U.S. PATENT DOCUMENTS

| 5,512,094 | A  | * | 4/1996  | Linton ......................... 106/409 |
| 6,652,967 | B2 | * | 11/2003 | Yadav et al. .................. 428/403 |
| 2005/0116205 | A1 | | 6/2005 | Muraguchi et al. |
| 2007/0022798 | A1 | | 2/2007 | Morinaga et al. |
| 2007/0048513 | A1 | | 3/2007 | Okamoto et al. |
| 2008/0124539 | A1 | | 5/2008 | Kawai et al. |
| 2008/0241474 | A1 | * | 10/2008 | Kawai et al. .................. 428/149 |

FOREIGN PATENT DOCUMENTS

| EP | 1 591 509 A1 | 11/2005 |
| EP | 1 787 959 A1 | 5/2007 |
| EP | 1 887 059 A1 | 2/2008 |
| JP | 2001-233611 | 8/2001 |
| JP | 2003-298087 | 10/2003 |
| JP | 2005-53737 | 3/2005 |
| JP | 2005-053737 | * 3/2005 |
| JP | 2006-335605 | 12/2006 |
| JP | 2006-335881 | 12/2006 |
| WO | WO 2006/009132 A1 | 1/2006 |

OTHER PUBLICATIONS

Office Action issued May 21, 2012, in European Patent Application No. 08 722 192.5.
Rüdiger Nass, et al., "Synthesis of an Alumina Coating From Chelated Aluminum Alkoxides", Journal of Non-Crystalline Solids, vol. 121, No. 1-3, XP 24059134, May 1990, pp. 329-333.
U.S. Appl. No. 12/557,648, filed Sep. 11, 2009, Kawai, et al.
U.S. Appl. No. 12/984,063, filed Jan. 4, 2011, Kawai, et al.
U.S. Appl. No. 13/097,121, filed Apr. 29, 2011, Kawai, et al.

* cited by examiner

*Primary Examiner* — Pegah Parvini
(74) *Attorney, Agent, or Firm* — Oblon, Spivak, McClelland, Maier & Neustadt, L.L.P.

(57) ABSTRACT

Hollow fine particles containing $SiO_2$ as the main component and containing another metal. The amount of the other metal (calculated as oxide) is 0.2 to 8 parts by mass based on 100 parts by mass of $SiO_2$. A coating composition containing the hollow fine particles and a dispersion medium. An article having a coating film including the coating composition formed on a substrate. A process for producing hollow fine particles, which includes (a) precipitating a shell containing $SiO_2$ as the main component and containing another metal on the surface of core fine particles, to obtain core/shell particles, and (b) dissolving or decomposing the core fine particles of the core/shell fine particles.

20 Claims, 1 Drawing Sheet

HOLLOW FINE PARTICLES, PRODUCTION PROCESS THEREOF, COATING COMPOSITION AND ARTICLE HAVING COATING FILM FORMED

TECHNICAL FIELD

The present invention relates to hollow fine particles, a production process thereof, a coating composition using the hollow fine particles, and an article having a coating film formed thereon.

BACKGROUND ART

As an antireflection film, heretofore, the following have been known.

(1) An antireflection film containing hollow fine particles comprising $SiO_2$ and a binder (Patent Document 1).

(2) An antireflection film formed from a binder containing hollow fine particles comprising $SiO_2$ and organic zirconium (Patent Document 2).

With respect to the antireflection film of (1), since the strength of the hollow fine particles is insufficient, it is necessary to increase the amount of the binder so as to secure the film strength. However, if the binder is increased, the amount of the air gap in the film tends to decrease, whereby the refractive index of the film will increase, and the antireflection effect will decrease.

With respect to the antireflection film of (2), although the strength of the binder is high, the strength of the hollow fine particles themselves is insufficient, and the film strength is still insufficient.

Patent Document 1: JP-A-2001-233611
Patent Document 2: JP-A-2003-298087

DISCLOSURE OF THE INVENTION

Object to be Accomplished by the Invention

The object of the present invention is to provide hollow fine particles with which a coating film having a high antireflection effect and high film strength can be obtained, a production process thereof, a coating composition with which a coating film having a high antireflection effect and high film strength can be formed, and an article which maintains a high antireflection effect for a long period of time.

Means to Accomplish the Object

That is, the present invention provides the following.

(1) Hollow fine particles containing $SiO_2$ as the main component and containing other metal, wherein the amount of said other metal (as calculated as oxide) is from 0.2 to 8 parts by mass based on 100 parts by mass of $SiO_2$.

(2) The hollow fine particles according to the above (1), which are mutually connected by chain solid fine particles containing $SiO_2$ as the main component and containing other metal.

(3) The hollow fine particles according to the above (1) or (2), wherein said other metal is at least one metal selected from the group consisting of Al, Cu, Ce, Sn, Ti, Cr, Co, Fe, Mn, Ni, Zn and Zr.

(4) A coating composition containing the hollow fine particles as defined in any one of the above (1) to (3) and a dispersion medium.

(5) A coating composition comprising hollow fine particles containing $SiO_2$ as the main component and containing other metal, and chain solid fine particles containing $SiO_2$ as the main component and containing other metal, which connect the hollow fine particles, dispersed in a dispersion medium, wherein the total amount of said other metal (as calculated as oxide) contained in the hollow fine particles and said other metal (as calculated as oxide) contained in the chain solid fine particles is from 0.2 to 8 parts by mass based on 100 parts by mass of the total amount of $SiO_2$ contained in the hollow fine particles and $SiO_2$ contained in the chain solid fine particles.

(6) The coating composition according to the above (4) or (5), which further contains a binder.

(7) An article, which comprises a substrate and a coating film comprising the coating composition as defined in any one of the above (4) to (6) formed on the substrate.

(8) A process for producing hollow fine particles containing $SiO_2$ as the main component and containing other metal, which comprises (a) a step of, in a dispersion containing a $SiO_2$ precursor material, at least one compound containing other metal, selected from the group consisting of a metal chelate compound, an organic tin compound, a metal alcoholate and a metal fatty acid salt, and core fine particles, precipitating a shell containing $SiO_2$ as the main component and containing other metal on the surface of each core fine particle to obtain core/shell particles, and (b) a step of dissolving or decomposing the core fine particles of the core/shell particles, wherein the amount of the compound containing other metal (as calculated as oxide) is from 0.2 to 8 parts by mass based on 100 parts by mass of the $SiO_2$ precursor material (as calculated as $SiO_2$).

(9) The process for producing hollow fine particles according to the above (8), wherein the $SiO_2$ precursor material is silicic acid, a silicate or a hydrolysable silane.

Effects Of The Invention

With the coating composition using the hollow fine particles of the present invention, a coating film having a high antireflection effect and high film strength can be formed.

Further, the article having a coating film comprising the coating composition of the present invention can maintain a high antireflection effect for a long period of time.

Still further, according to the process for producing hollow fine particles of the present invention, hollow fine particles with which a coating film having a high antireflection effect and high film strength can be obtained, can be produced.

BEST MODE FOR CARRYING OUT THE INVENTION (Hollow Fine Particles)

Hollow fine particles are particles each having an air gap in the interior of the shell. The hollow fine particles may, for example, be spherical hollow fine particles, fibrous hollow fine particles, tubular hollow fine particles or sheet-form hollow fine particles. The fibrous hollow fine particles are hollow fine particles of which the length in the extended direction is longer than the length in the direction perpendicular to the extended direction. The fibrous hollow fine particles may be primary particles or may be secondary particles which are agglomerates of a plurality of hollow fine particles.

The hollow fine particles contain $SiO_2$ as the main component and contain other metal.

The ratio of $SiO_2$ is preferably at least 90 mass % in the hollow fine particles (100 mass %) with a view to suppressing the refractive index of the hollow fine particles.

Said other metal may be at least one metal selected from the group consisting of Al, Cu, Ce, Sn, Ti, Cr, Co, Fe, Mn, Ni, Zn and Zr. Said other metal may form a composite oxide with Si.

The amount of other metal (as calculated as oxide) contained in the hollow fine particles is from 0.2 to 8 parts by mass, preferably from 0.5 to 5 parts by mass based on 100 parts by mass of $SiO_2$ contained in the hollow fine particles. When the amount of other metal (as calculated as oxide) is at least 0.2 part by mass, the strength of the hollow fine particles will be sufficiently high. When the amount of other metal (as calculated as oxide) is at most 8 parts by mass, the refractive index of the hollow fine particles will be suppressed.

The amount of other metal (as calculated as oxide) is, in the case where said other metal is Al, the amount as calculated as $Al_2O_3$, the amount as calculated as CuO in the case of Cu, the amount as calculated as $CeO_2$ in the case of Ce, the amount as calculated as $SnO_2$ in the case of Sn, the amount as calculated as $TiO_2$ in the case of Ti, the amount as calculated as $Cr_2O_3$ in the case of Cr, the amount as calculated as CoO in the case of Co, the amount as calculated as $Fe_2O_3$ in the case of Fe, the amount as calculated as $MnO_2$ in the case of Mn, the amount as calculated as NiO in the case of Ni, the amount as calculated as $ZnO_2$ in the case of Zn and the amount as calculated as $ZrO_2$ in the case of Zr.

The average agglomerated particle size of the hollow fine particles is preferably from 5 to 300 nm, more preferably from 10 to 100 nm. If the average agglomerated particle size of the hollow fine particles is at least 5 nm, a sufficient air gap is formed between adjacent hollow fine particles, whereby the refractive index of the coating film will be low, thus leading to a high antireflection effect. When the average agglomerated particle size of the hollow fine particles is at most 300 nm, scattering of light will be suppressed, whereby a coating film with high transparency will be obtained.

The average agglomerated particle size of the hollow fine particles is the average agglomerated particle size of the hollow fine particles in a dispersion medium and is measured by dynamic light scattering method.

The average primary particle size of the hollow fine particles is preferably from 5 to 100 nm, particularly preferably from 5 to 50 nm. When the average primary particle size of the hollow fine particles is within these ranges, a high antireflection effect of the coating film will be obtained.

The average primary particle size of the hollow fine particles is the average of particle sizes of 100 hollow fine particles randomly selected by observation with a transmission electron microscope. In the case of fibrous, tubular, sheet-form hollow fine particles, etc., the major axis is regarded as the particle size.

The refractive index of the hollow fine particles is preferably from 1.1 to 1.4, more preferably from 1.2 to 1.35. When the refractive index of the hollow fine particles is at least 1.1, a coating film having a refractive index of at least 1.2 is likely to be obtained, and a coating film having a high antireflection effect will be obtained when glass is used as the substrate. Further, when the refractive index of the hollow fine particles is at least 1.1, a shell with a sufficient thickness will be obtained, whereby the strength of the hollow fine particles will be high.

When the refractive index of the hollow fine particles is at most 1.4, a coating film having a refractive index of at most 1.4 is likely to be obtained, and a coating film having a high antireflection effect will be obtained when glass is used as the substrate.

The refractive index of the hollow fine particles is the refractive index at 550 nm, and is calculated by measuring the refractive index by a refractometer as dispersed in a dispersion medium or in the form of a coating film with a binder, which is calculated by the volume fraction.

(Process for Producing Hollow Fine Particles)

The hollow fine particles are preferably produced by a production process comprising the following steps (a) and (b).

(a) a step of, in a dispersion containing a $SiO_2$ precursor material, at least one compound containing other metal, selected from the group consisting of a metal chelate compound, an organic tin compound, a metal alcoholate and a metal fatty acid salt, and core fine particles, precipitating a shell containing $SiO_2$ as the main component and containing other metal on the surface of each core fine particle to obtain core/shell particles, and (b) a step of dissolving or decomposing the core fine particles of the core/shell particles.

Step (a):

The core fine particles may, for example, be heat decomposable organic fine particles (such as surfactant micells, a water soluble organic polymer, a styrene resin or an acrylic resin), acid-soluble inorganic fine particles (such as ZnO, $NaAlO_2$, $CaCO_3$ or basic $ZnCO_3$) or photo-soluble inorganic fine particles (such as ZnS, CdS or ZnO).

The $SiO_2$ precursor material may, for example, be silicic acid, a silicate or a hydrolyzable silane (such as tetramethoxysilane or tetraethoxysilane).

The compound containing other metal (hereinafter referred to simply as an additive compound) accelerates dehydrated polycondensation reaction of the $SiO_2$ precursor material.

The additive compound may, for example, be a metal chelate compound, an organic tin compound, a metal alcholate or a metal fatty acid salt, and in view of the strength of the hollow fine particles, it is preferably a metal chelate compound or an organic tin compound, particularly preferably a metal chelate compound.

When a metal chelate compound is added, chain solid fine particles are formed as by-products, whereby such a structure is likely to be formed that the hollow fine particles are connected by the chain solid fine particles.

The metal chelate compound may, for example, be an aluminum chelate compound (such as aluminum acetylacetonate, aluminum bis(ethylacetoacetate)mono(acetylacetonate), aluminum-di-n-butoxide-monoethylacetoacetate, aluminum-di-isopropoxide-monomethylacetoacetate or diisopropoxyaluminum ethyl acetate), a titanium chelate compound (such as titanium acetylacetonate or titanium tetraacetylacetonate), a copper chelate compound (such as copper acetylacetonate), a cerium chelate compound (such as cerium acetylacetonate), a chromium chelate compound (such as chromium acetylacetonate), a cobalt chelate compound (such as cobalt acetylacetonate), a tin chelate compound (such as tin acetylacetonate), an iron chelate compound (such as iron(III) acetylacetonate), a manganese chelate compound (such as manganese acetylacetonate), a nickel chelate compound (such as nickel acetylacetonate), a zinc chelate compound (such as zinc acetylacetonate) or a zirconium chelate compound (such as zirconium acetylacetonate). In view of the strength of the hollow fine particles, a metal acetylacetonate is preferred.

The organic tin compound may, for example, be dibutyltin dilaurate, dioctyltin dilaurate, dibutyltin diacetate, dioctyltin diacetate, dibutyltin diacetylacetonate or dibutyltin bistriethoxysilicate.

The metal alcholate may, for example, be tetraisopropyl titanate, tetra-n-butyl titanate, tetra-2-ethylhexy titanate, aluminum triethoxide or aluminum triisopropoxide.

The metal fatty acid salt may, for example, be zinc naphthenate, cobalt octylate or cobalt naphthenate.

The amount of the compound containing other metal (as calculated as oxide) is from 0.2 to 8 parts by mass, preferably from 0.5 to 5 parts by mass based on 100 parts by mass of the amount of the $SiO_2$ precursor material (as calculated as $SiO_2$). When the amount of the compound containing other metal (as calculated as oxide) is at least 0.2 part by mass, the strength of the hollow fine particles will be sufficiently high. When the amount of the compound containing other metal (as calculated as oxide) is at most 8 parts by mass, the refractive index of the hollow fine particles will be suppressed.

The dispersion medium may, for example, be water, an alcohol (such as methanol, ethanol or isopropanol), a ketone (such as acetone or methyl ethyl ketone), an ether (such as tetrahydrofuran or 1,4-dioxane), an ester (such as ethyl acetate or methyl acetate), a glycol ether (such as ethylene glycol monoalkyl ether), a nitrogen-containing compound (such as N,N-dimethylacetamide or N,N-dimethylformamide) or a sulfur-containing compound (such as dimethyl sulfoxide).

The dispersion medium preferably contains water in an amount of from 5 to 100 mass % based on 100 mass % of the dispersion medium, since water is necessary for hydrolysis of the $SiO_2$ precursor material.

The pH of the dispersion medium is preferably at least 7, more preferably at least 8, particularly preferably from 9 to 10, from such a viewpoint that the $SiO_2$ precursor material is likely to be three-dimensionally polymerized to form the shell. In a case where acid-soluble inorganic fine particles are used as the core fine particles, a pH at which the fine particles will not be dissolved, i.e. at least 8, is preferred.

Step (b):

In a case where the core fine particles are acid-soluble inorganic fine particles, the core fine particles can be dissolved and removed by adding an acid.

The acid may, for example, be an inorganic acid (such as hydrochloric acid, sulfuric acid or nitric acid), an organic acid (such as formic acid or acetic acid) or an acidic cation exchange resin.

(Coating Composition)

The coating composition of the present invention contains hollow fine particles and a dispersion medium and as the case requires, a binder.

The dispersion medium may, for example, be water, an alcohol (such as methanol, ethanol or isopropanol), a ketone (such as acetone or methyl ethyl ketone), an ether (such as tetrahydrofuran or 1,4-dioxane), an ester (such as ethyl acetate or methyl acetate), a glycol ether (such as ethylene glycol monoalkyl ether), a nitrogen-containing compound (such as N,N-dimethylacetamide or N,N-dimethylformamide) or a sulfur-containing compound (such as dimethyl sulfoxide).

The binder may, for example, be a hydrolyzable silane (such as tetramethoxysilane or tetraethoxysilane), a silicic acid oligomer obtained by hydrolyzing a hydrolyzable silane, a silicon compound having a silanol group (such as silicic acid or trimethyl silanol), active silica (such as water glass or sodium orthosilicate) or an organic polymer (such as polyethylene glycol, a polyacrylamide derivative or polyvinyl alcohol).

The binder preferably contains a curing catalyst, with a view to improving the film strength.

The mass ratio of the hollow fine particles to the binder (hollow fine particles/binder) is preferably from 10/0 to 5/5, more preferably from 9/1 to 7/3. When the mass ratio of the hollow fine particles/binder is within these ranges, a coating film which has sufficient film strength, of which the refractive index is kept low, and which has a high antireflection effect, can be formed.

The solid content concentration of the coating composition of the present invention is preferably from 0.1 to 20 mass %.

The coating composition of the present invention may contain hollow fine particles other than the hollow fine particles of the present invention or solid fine particles (particularly chain solid fine particles) within a range not to impair the effects of the present invention.

For example, a coating film comprising a coating composition having the hollow fine particles of the present invention dispersed in a dispersion medium in a state where they are mutually connected by the chain solid fine particles, is less likely to be peeled from the substrate, by formation of a network.

The chain solid fine particles are particles of which the length in the extended direction is longer than the length in the direction perpendicular to the extended direction. The chain solid fine particles are usually secondary particles as agglomerates, but not necessarily limited to secondary particles. The shape of the primary particles constituting the secondary particles may, for example, be spherical, needle or rod. As the form of agglomeration of a plurality of primary particles, preferred is such a form that chain or pearl necklace-form secondary particles are intertwined to form a two-dimensional or three-dimensional network as a whole.

In the above step (a), when a metal chelate compound is added as the compound containing other metal, chain solid fine particles are formed as by-products, whereby such a structure is likely to be formed that the hollow fine particles are mutually connected by the chain solid fine particles. In such a case, the composition of the chain solid fine particles is substantially the same as the composition of the hollow fine particles.

The chain solid fine particles contain $SiO_2$ as the main component and contain other metal component.

The ratio of $SiO_2$ contained in the hollow fine particles and the chain solid fine particles is preferably at least 90 mass % based on the total amount (100 mass %) of the hollow fine particles and the chain solid fine particles, with a view to suppressing the refractive index of the chain solid fine particles.

Said other metal may be at lease one metal selected from the group consisting of Al, Cu, Ce, Sn, Ti, Cr, Co, Fe, Mn, Ni, Zn and Zr. Said other metal may form a composite oxide with Si.

The total amount of other metal (as calculated as oxide) contained in the hollow fine particles and other metal (as calculated as oxide) contained in the chain solid fine particles is from 0.2 to 8 parts by mass, preferably from 0.5 to 5 parts by mass based on 100 parts by mass of the total amount of $SiO_2$ contained in the hollow fine particles and $SiO_2$ contained in the chain solid fine particles.

The amount of other metal (as calculated as oxide) is, in the case where said other metal is Al, the amount as calculated as $Al_2O_3$, the amount as calculated as CuO in the case of Cu, the amount as calculated as $CeO_2$ in the case of Ce, the amount as calculated as $SnO_2$ in the case of Sn, the amount as calculated as $TiO_2$ in the case of Ti, the amount as calculated as $Cr_2O_3$ in the case of Cr, the amount as calculated as CoO in the case of Co, the amount as calculated as $Fe_2O_3$ in the case of Fe, the amount as calculated as $MnO_2$ in the case of Mn, the amount as calculated as NiO in the case of Ni, the amount as calculated as $ZnO_2$ in the case of Zn and the amount as calculated as $ZrO_2$ in the case of Zr.

The aspect ratio of the chain solid fine particles is preferably from 2 to 10, more preferably from 5 to 10. When the aspect ratio of the chain solid fine particles is at least 2, a sufficient air gap is formed between adjacent chain solid fine particles, whereby the refractive index of the coating film will be low, thus leading to a high antireflection effect. When the aspect ratio of the chain solid fine particles is at most 10, excellent film forming properties will be obtained, whereby a coating film excellent in the outer appearance will be obtained.

The aspect ratio of the chain solid fine particles is a value calculated by dividing the length in the extended direction by the length in the direction perpendicular to the extended direction. The length in the extended direction and the length in the direction perpendicular to the extended direction are measured by observation by an electron microscope or the like.

Further, when the aspect ratio of the chain solid fine particles is determined, the direction in which the size of each fine particle is maximum is regarded as the extended direction.

The average length in the extended direction of the chain solid fine particles is preferably from 2 to 500 nm, more preferably from 10 to 100 nm. When the average length in the extended direction of the chain solid fine particles is at least 2 nm, a network is likely to be formed when the coating film is formed, whereby the coating film is less likely to be peeled off from the substrate. When the average length in the extended direction of the chain solid fine particles is at most 500 nm, excellent film forming properties will be obtained, whereby a coating film excellent in the outer appearance will be obtained.

The average length in the direction perpendicular to the extended direction of the chain solid fine particles is preferably from 1 to 50 nm, more preferably from 1 to 20 nm. When the average length in the direction perpendicular to the extended direction of the chain solid fine particles is at least 1 nm, a network is maintained when the coating film is formed, whereby the coating film is less likely to be peeled off from the substrate. When the average length in the direction perpendicular to the extended direction of the chain solid fine particles is at most 50 nm, the adhesive properties can be improved without increasing the refractive index.

The length in the extended direction of the chain solid fine particles varies among the respective particles and has a distribution within a certain range as a whole. The average length in the extended direction of the chain solid fine particles means the average of the distribution. The same applies to the average length in the direction perpendicular to the extended direction.

The coating composition of the present invention may contain known additives such as an alkaline earth metal salt such as a chloride, a nitrate, a sulfate, a formate or an acetate of e.g. Mg, Ca, Sr or Ba; a curing catalyst such as an inorganic acid, an organic acid, a base, a metal chelate compound, a quaternary ammonium salt or an organic tin compound; inorganic fine particles showing ultraviolet shielding properties, infrared shielding properties or electroconductive properties; or a pigment, a dye or a surfactant.

(Article Having Coating Film Formed)

The article of the present invention is an article having a coating film comprising the coating composition of the present invention formed thereon.

The thickness of the coating film is preferably from 50 to 300 nm, more preferably from 80 to 200 nm. When the thickness of the coating film is at least 50 nm, interference of light will occur, whereby antireflection performance will be developed. When the thickness of the coating film is at most 300 nm, a film can be formed without cracking.

The thickness of the coating film is obtained by measuring the interface between the coated surface and the non-coated surface by a profilometer.

The refractive index of the coating film is preferably from 1.2 to 1.4, more preferably from 1.23 to 1.35. When the refractive index of the coating film is at least 1.2, the light reflected on the upper film surface and the light reflected on the lower film surface are offset by interference, whereby a coating film having a high antireflection effect is obtained. When the refractive index of the coating film is at most 1.4, the light reflected on the upper film surface and the light reflected on the lower film surface are offset by interference, whereby a coating film having a high antireflection effect will be obtained when glass is used as the substrate. The refractive index of the coating film is preferably from 0.0 to 1.4%, more preferably from 0.0 to 1.0%.

The refractive index of the coating film is a refractive index at 550 nm and is measured by a refractometer.

The coating film is formed by applying the coating composition of the present invention to the surface of a substrate and drying it. The coating film is preferably further heated or baked in view of the film strength.

The material of the substrate may, for example, be glass, a metal, an organic polymer or silicon, and the substrate may be a substrate having any coating film preliminarily formed thereon.

As the glass, not only glass formed by float process or the like but also patterned glass obtained by rollout process by supplying molten glass between a roll member having irregularities imprinted on the surface and another roll member may be used. Particularly, patterned glass having a coating film formed by applying and drying the coating composition of the present invention can be preferably used as a cover glass for solar cells. In such a case, the coating film is preferably formed on the smooth surface (a surface with a low degree of irregularities) of the patterned glass.

The organic polymer may, for example, be polyethylene terephthalate (hereinafter referred to as PET), polycarbonate, polymethyl methacrylate or triacetyl acetate.

The shape of the substrate may, for example, be a plate or a film.

On the article of the present invention, another functional layer (such as an adhesion-improving layer or a protective layer) may be formed within a range not to impair the effects of the present invention.

In the present invention, it is preferred that only the coating film of the present invention is formed, in view of the productivity and durability.

As the coating method, a known method such as bar coating, die coating, gravure coating, roll coating, flow coating, spray coating, online spray coating or dip coating may be mentioned. The online spray coating is a method of spray coating on the same line for formation of the substrate, and is capable of producing articles at a low cost and is useful, since a step of re-heating the substrate can be omitted.

The hollow fine particles of the present invention are hollow fine particles containing $SiO_2$ as the main component and containing other metal, the amount of other metal (as calculated as oxide) contained in the hollow fine particles being from 0.2 to 8 parts by mass based on 100 parts by mass of $SiO_2$ contained in the hollow fine particles, and accordingly their refractive index is suppressed and they have high strength. Thus, a coating film having a high antireflection effect and high film strength can be obtained.

The process for producing hollow fine particles of the present invention comprises (a) a step of, in a dispersion containing a $SiO_2$ precursor material, at least one compound containing other metal, selected from the group consisting of a metal chelate compound, an organic tin compound, a metal alcoholate and a metal fatty acid salt, and core fine particles, precipitating a shell containing $SiO_2$ as the main component and containing other metal on the surface of each core fine particle to obtain core/shell particles, and (b) a step of dissolving or decomposing the core fine particles of the core/shell particles, and the amount of the compound containing said other metal (as calculated as oxide) is from 0.2 to 8 parts by mass based on 100 parts by mass of the $SiO_2$ precursor material (as calculated as $SiO_2$), and accordingly hollow fine particles with which a coating film having a high antireflection effect and high film strength can be obtained, can be produced.

With the coating composition of the present invention, which contains the hollow fine particles of the present invention having a refractive index suppressed and having high strength, a coating film having a high antireflection effect and high film strength can be formed. Particularly, the film strength is sufficiently high, and the antireflection effect is very excellent, even without a binder or with a small amount of the binder.

The article of the present invention has a coating film comprising the coating composition of the present invention formed on a substrate, and accordingly it can maintain a high antireflection effect for a long period of time.

EXAMPLES

Now, the present invention will be described in further detail with reference to Examples. However, it should be understood that the present invention is by no means restricted to such specific Examples.

Examples 1 to 13 are Examples of the present invention, and Examples 14 to 20 are Comparative Examples.

(Average Primary Particle Size of Hollow Fine Particles)

The average primary particle size of the hollow fine particles was measured as follows. A dispersion of the hollow fine particles was diluted to 0.1 mass % with ethanol, sampled on a collodion membrane and observed by a transmission electron microscope (manufactured by Hitachi Limited, H-9000). One hundred hollow fine particles were randomly selected, the particle sizes of the respective hollow fine particles were measured, and the average of the particle sizes of the one hundred hollow fine particles were obtained to determine the average primary particle size of the hollow fine particles.

(Average Agglomerated Particle Size of Hollow Fine Particles and Chain Solid Fine Particles)

The average agglomerated particle size of the hollow fine particles and the chain solid fine particles was measured by a dynamic light scattering particle size analyzer (manufactured by NIKKISO CO., LTD., Microtrac UPA).

(Amount of Other Metal Contained in Hollow Fine Particles and Chain Solid Fine Particles)

The amount of other metal (as calculated as oxide) contained in the hollow fine particles and the chain solid fine particles was obtained by measuring the amounts of Si and other metal by a fluorescent X-ray analyzer (manufactured by Rigaku Corporation, RIX3000), obtaining their amounts as calculated as oxide, and calculating the amount of other metal (as calculated as oxide) based on 100 parts by mass of $SiO_2$.

(Minimum Reflectance)

The reflectance of the coating film on the substrate at from 380 to 1,200 nm was measured by a spectrophotometer (manufactured by Hitachi Limited, model: U-4100) to obtain the minimum value of the reflectance (minimum reflectance).

The surface of the coating film was abraded with felt under a load of 1 kg for 1,000 reciprocations, and then the reflectance was measured in the same manner to obtain the minimum value of the reflectance (minimum reflectance).

The difference ($\Delta$ reflectance) between the minimum reflectance after abrasion and the initial minimum reflectance (before abrasion) was determined.

Preparation of Silicic Acid Oligomer Solution:

5 g of a 60 mass % aqueous nitric acid solution was added to 95 g of an ethanol solution of tetraethoxysilane (solid content concentration: 5 mass % as calculated as $SiO_2$), whereby tetraethoxysilane was hydrolyzed to obtain a silicic acid oligomer solution (solid content concentration: 5 mass %).

Example 1

To a 200 mL glass container, 58.964 g of ethanol, 30.000 g of a water-dispersed sol of fine ZnO particles (average primary particle size: 20 nm, average agglomerated particle size: 40 nm, solid content concentration: 20 mass %), 10.000 g of tetraethoxysilane (solid content concentration: 28.84 mass % as calculated as $SiO_2$) and 0.037 g of aluminum acetylacetonate (0.20 part by mass as calculated as $Al_2O_3$ based on 100 parts by mass of tetraethoxysilane as calculated as $SiO_2$) were added, and 1.000 g of a 28 mass % aqueous ammonia solution was added to adjust the pH to 10, followed by stirring at 20° C. for 6 hours to obtain 100.000 g of a dispersion of core/shell particles (solid content concentration: 8.88 mass %).

100 g of a strongly acidic cation exchange resin (total exchange capacity: at least 2.0 meq/mL) was added to 100 g of the dispersion of the core/shell particles, followed by stirring for one hour, and after the pH became 4, the strongly acidic cation exchange resin was removed by filtration to obtain a dispersion of hollow fine particles. The dispersion was concentrated by ultrafiltration to a solid content concentration of 20 mass %. The dispersion was observed by a transmission electron microscope, whereupon the average primary particle size of the hollow fine particles was 30 nm, and the hollow fine particles are mutually connected by chain solid fine particles. The average agglomerated particle size of the hollow fine particles and the chain solid fine particles was 60 nm, and the amount of Al (as calculated as $Al_2O_3$) contained in the hollow fine particles and the chain solid fine particles was 0.20 part by mass based on 100 parts by mass of $SiO_2$.

To a 200 mL glass container, 6 g of the dispersion (solid content concentration: 20 mass %) of the hollow fine particles, 6 g of a silicic acid oligomer solution (solid content concentration: 5 mass %) and 88 g of ethanol were added, followed by stirring for 10 minutes to obtain a coating composition (solid content concentration: 1.5 mass %).

The coating composition was applied to the surface of a glass substrate (100 mm×100 mm×3.5 mm in thickness) wiped with ethanol and spin-coated at a number of revolutions of 200 rpm for 60 seconds for uniformarization, and baked at 650° C. for 10 minutes to form a coating film having a thickness of 100 nm, and various evaluations were carried out. The results are shown in Table 1.

Example 2

Figure 1:
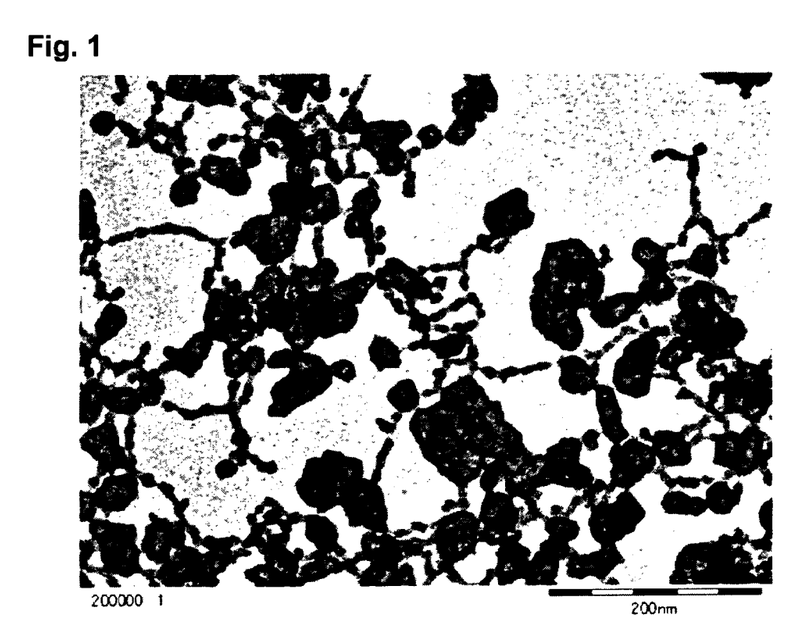
FIG. 1 is an electron microphotograph of a dispersion containing hollow fine particles obtained in Example 2 (Example of the present invention) of the present invention.

A dispersion of hollow fine particles was obtained in the same manner as in Example 1 except that the amount of ethanol was changed to 58.707 g, and the amount of aluminum acetylacetonate was changed to 0.294 g (1.6 parts by mass as calculated as $Al_2O_3$ based on 100 parts by mass of tetraethoxysilane as calculated as $SiO_2$). The dispersion was concentrated to a solid content concentration of 20 mass % by ultrafiltration. The dispersion was observed by a transmission electron microscope (200,000 magnifications), whereupon the average primary particle size of the hollow fine particles was 30 nm, and the hollow fine particles were mutually connected by chain solid fine particles (the electron microphotograph is shown in FIG. 1). The average agglomerated particle size of the hollow fine particles and the chain solid fine particles was 70 nm, and the amount of Al (as calculated as $Al_2O_3$) contained in the hollow fine particles and the chain solid fine particles was 1.6 parts by mass based on 100 parts by mass of $SiO_2$.

A coating film having a thickness of 100 nm was formed on a glass substrate in the same manner as in Example 1 except that the dispersion (solid content concentration: 20 mass %) of the hollow fine particles in Example 2 was used, and various evaluations were carried out. The results are shown in Table 1.

Example 3

A dispersion of hollow fine particles was obtained in the same manner as in Example 1 except that the amount of ethanol was changed to 57.533 g, and the amount of aluminum acetylacetonate was changed to 1.468 g (8.0 parts by mass as calculated as $Al_2O_3$ based on 100 parts by mass of tetraethoxysilane as calculated as $SiO_2$). The dispersion was concentrated to a solid content concentration of 20 mass % by ultrafiltration. The dispersion was observed by a transmission electron microscope, whereupon the average primary particle size of the hollow fine particles was 30 nm, and the hollow fine particles were mutually connected by chain solid fine particles. The average agglomerated particle size of the hollow fine particles and the chain solid fine particles was 90 nm, and the amount of Al (as calculated as $Al_2O_3$) contained in the hollow fine particles and the chain solid fine particles was 8.0 parts by mass based on 100 parts by mass of $SiO_2$.

A coating film having a thickness of 100 nm was formed on a glass substrate in the same manner as in Example 1 except that the dispersion (solid content concentration: 20 mass %) of the hollow fine particles in Example 3 was used, and various evaluations were carried out. The results are shown in Table 1.

Example 4

A dispersion of hollow fine particles was obtained in the same manner as in Example 2 except that the amount of ethanol was changed to 58.716 g, and 0.285 g of copper acetylacetonate (3.0 parts by mass as calculated as CuO based on 100 parts by mass of tetraethoxysilane as calculated as $SiO_2$) was used instead of 0.294 g of aluminum acetylacetonate. The dispersion was concentrated to a solid content concentration of 20 mass % by ultrafiltration. The dispersion was observed by a transmission electron microscope, whereupon the average primary particle size of the hollow fine particles was 30 nm, and the hollow fine particles were mutually connected by chain solid fine particles. The average agglomerated particle size of the hollow fine particles and the chain solid fine particles was 80 nm, and the amount of Cu (as calculated as CuO) contained in the hollow fine particles and the chain solid fine particles was 3.0 parts by mass based on 100 parts by mass of $SiO_2$.

A coating film having a thickness of 100 nm was formed on a glass substrate in the same manner as in Example 1 except that the dispersion (solid content concentration: 20 mass %) of the hollow fine particles in Example 4 was used, and various evaluations were carried out. The results are shown in Table 1.

Example 5

A dispersion of hollow fine particles was obtained in the same manner as in Example 2 except that the amount of ethanol was changed to 58.780 g, and 0.220 g of cerium acetylacetonate trihydrate (3.0 parts by mass as calculated as $CeO_2$ based on 100 parts by mass of tetraethoxysilane as calculated as $SiO_2$) was used instead of 0.294 g of aluminum acetylacetonate. The dispersion was concentrated to a solid content concentration of 20 mass % by ultrafiltration. The dispersion was observed by a transmission electron microscope, whereupon the average primary particle size of the hollow fine particles was 30 nm, and the hollow fine particles were mutually connected by chain solid fine particles. The average agglomerated particle size of the hollow fine particles and the chain solid fine particles was 80 nm, and the amount of Ce (as calculated as $CeO_2$) contained in the hollow fine particles and the chain solid fine particles was 3.0 parts by mass based on 100 parts by mass of $SiO_2$.

A coating film having a thickness of 100 nm was formed on a glass substrate in the same manner as in Example 1 except that the dispersion (solid content concentration: 20 mass %) of the hollow fine particles in Example 5 was used, and various evaluations were carried out. The results are shown in Table 1.

Example 6

A dispersion of hollow fine particles was obtained in the same manner as in Example 2 except that the amount of ethanol was changed to 58.473 g, and 0.528 g of diisopropoxyaluminum ethyl acetate (3.4 parts by mass as calculated as $Al_2O_3$ based on 100 parts by mass of tetraethoxysilane as calculated as $SiO_2$) was used instead of 0.294 g of aluminum acetylacetonate. The dispersion was concentrated to a solid content concentration of 20 mass % by ultrafiltration. The dispersion was observed by a transmission electron microscope, whereupon the average primary particle size of the hollow fine particles was 30 nm, and the hollow fine particles were mutually connected by chain solid fine particles. The average agglomerated particle size of the hollow fine particles and the chain solid fine particles was 80 nm, and the amount of Al (as calculated as $Al_2O_3$) contained in the hollow fine particles and the chain solid fine particles was 3.4 parts by mass based on 100 parts by mass of $SiO_2$.

A coating film having a thickness of 100 nm was formed on a glass substrate in the same manner as in Example 1 except that the dispersion (solid content concentration: 20 mass %) of the hollow fine particles in Example 6 was used, and various evaluations were carried out. The results are shown in Table 1.

Example 7

To a 200 mL glass container, 5.25 g of the dispersion (solid content concentration: 20 mass %) of the hollow fine particles in Example 2, 9 g of a silicic acid oligomer solution (solid content concentration: 5 mass %) and 85.75 g of ethanol were added, followed by stirring for 10 minutes to obtain a coating composition (solid content concentration: 1.5 mass %).

A coating film having a thickness of 100 nm was formed on a glass substrate in the same manner as in Example 1 except that the coating composition in Example 7 was used, and various evaluations were carried out. The results are shown in Table 1.

Example 8

To a 200 mL glass container, 4.5 g of the dispersion (solid content concentration: 20 mass %) of the hollow fine particles in Example 2, 12 g of a silicic acid oligomer solution (solid content concentration: 5 mass %) and 83.5 g of ethanol were added, followed by stirring for 10 minutes to obtain a coating composition (solid content concentration: 1.5 mass %).

A coating film having a thickness of 100 nm was formed on a glass substrate in the same manner as in Example 1 except that the coating composition in Example 8 was used, and various evaluations were carried out. The results are shown in Table 1.

Example 9

To a 200 mL glass container, 7.5 g of the dispersion (solid content concentration: 20 mass %) of the hollow fine particles in Example 2, and 92.5 g of ethanol were added, followed by stirring for 10 minutes to obtain a coating composition (solid content concentration: 1.5 mass %).

A coating film having a thickness of 100 nm was formed on a glass substrate in the same manner as in Example 1 except that the coating composition in Example 9 was used, and various evaluations were carried out. The results are shown in Table 1.

Example 10

The coating composition in Example 2 was applied to the surface of a PET film (polyethylene terephthalate film) (100 mm×100 mm×0.2 mm in thickness) wiped with ethanol and spin-coated at a number of revolutions of 200 rpm for 60 seconds for uniformalization, and heated at 100° C. for 10 minutes to form a coating film having a thickness of 100 nm, and various evaluations were carried out. The results are shown in Table 1.

Example 11

A dispersion of hollow fine particles was obtained in the same manner as in Example 2 except that the amount of ethanol was changed to 58.681 g, and 0.320 g of zirconium acetylacetonate (2.8 parts by mass as calculated as $ZrO_2$ based on 100 parts by mass of tetraethoxysilane as calculated as $SiO_2$) was used instead of 0.294 g of aluminum acetylacetonate. The dispersion was concentrated to a solid content concentration of 20 mass % by ultrafiltration. The dispersion was observed by a transmission electron microscope, whereupon the average primary particle size of the hollow fine particles was 30 nm, and the hollow fine particles were mutually connected by chain solid fine particles. The average agglomerated particle size of the hollow fine particles and the chain solid fine particles was 70 nm, and the amount of Zr (as calculated as $ZrO_2$) contained in the hollow fine particles and the chain solid fine particles was 2.8 parts by mass based on 100 parts by mass of $SiO_2$.

A coating film having a thickness of 100 nm was formed on a glass substrate in the same manner as in Example 1 except that the dispersion (solid content concentration: 20 mass %) of the hollow fine particles in Example 11 was used, and various evaluations were carried out. The results are shown in Table 1.

Example 12

To a 200 mL glass container, 5.25 g of the dispersion (solid content concentration: 20 mass %) of the hollow fine particles in Example 11, 9 g of a silicic acid oligomer solution (solid content concentration: 5 mass %) and 85.75 g of ethanol were added, followed by stirring for 10 minutes to obtain a coating composition (solid content concentration: 1.5 mass %).

A coating film having a thickness of 100 nm was formed on a glass substrate in the same manner as in Example 1 except that the coating composition in Example 12 was used, and various evaluations were carried out. The results are shown in Table 1.

Example 13

To a 200 mL glass container, 4.5 g of the dispersion (solid content concentration: 20 mass %) of the hollow fine particles in Example 11.12 g of a silicic acid oligomer solution (solid content concentration: 5 mass %) and 83.5 g of ethanol were added, followed by stirring for 10 minutes to obtain a coating composition (solid content concentration: 1.5 mass %).

A coating film having a thickness of 100 nm was formed on a glass substrate in the same manner as in Example 1 except that the coating composition in Example 13 was used, and various evaluations were carried out. The results are shown in Table 1.

Example 14

Figure 2:
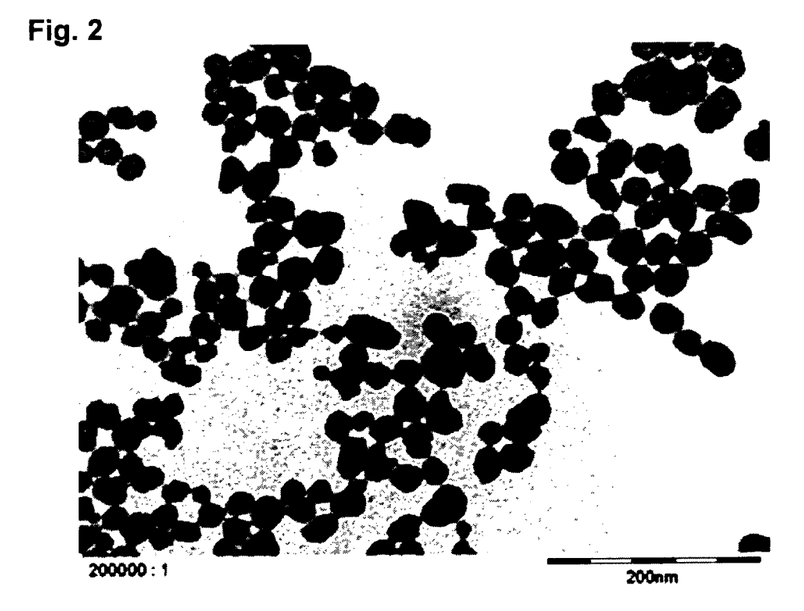
FIG. 2 is an electron microphotograph of a dispersion containing hollow fine particles obtained in Example 14 (Comparative Example) of the present invention.

A dispersion of hollow fine particles was obtained in the same manner as in Example 1 except that the amount of ethanol was changed to 59.000 g, and no aluminum acetylacetonate was added. The dispersion was concentrated to a solid content concentration of 20 mass % by ultrafiltration. The dispersion was observed by a transmission electron microscope (200,000 magnifications), whereupon the average primary particle size of the hollow fine particles was 30 nm, no chain solid fine particles were formed, and most were hollow fine particles (the electron microphotograph is shown in FIG. 2). The average agglomerated particle size of the hollow fine particles was 60 nm. The amount of other metal (as calculated as oxide) contained in the hollow fine particles was 0 part by mass based on 100 parts by mass of $SiO_2$.

A coating film having a thickness of 100 nm was formed on a glass substrate in the same manner as in Example 1 except that the dispersion (solid content concentration: 20 mass %) of the hollow fine particles in Example 14 was used, and various evaluations were carried out. The results are shown in Table 1.

Example 15

A dispersion of hollow fine particles was obtained in the same manner as in Example 1 except that the amount of ethanol was changed to 58.995 g, and the amount of aluminum acetylacetonate was changed to 0.006 g (0.03 part by mass as calculated as $Al_2O_3$ based on 100 parts by mass of tetraethoxysilane as calculated as $SiO_2$). The dispersion was concentrated to a solid content concentration of 20 mass % by ultrafiltration. The dispersion was observed by a transmission electron microscope, whereupon the average primary particle size of the hollow fine particles was 30 nm, no chain solid fine particles were formed, and most were hollow fine particles. The average agglomerated particle size of the hollow fine particles was 60 nm. The amount of Al (as calculated as $Al_2O_3$) contained in the hollow fine particles was 0.03 part by mass based on 100 parts by mass of $SiO_2$.

A coating film having a thickness of 100 nm was formed on a glass substrate in the same manner as in Example 1 except that the dispersion (solid content concentration: 20 mass %) of the hollow fine particles in Example 15 was used, and various evaluations were carried out. The results are shown in Table 1.

Example 16

A dispersion of fine particles was obtained in the same manner as in Example 1 except that the amount of ethanol was changed to 57.276 g, and the amount of aluminum acetylacetonate was changed to 1.725 g (9.4 parts by mass as calculated as $Al_2O_3$ based on 100 parts by mass of tetraethoxysilane as calculated as $SiO_2$. The dispersion was concentrated to a solid content concentration of 20 mass % by ultrafiltration. The dispersion was observed by a transmission electron microscope, whereupon most of the fine particles were chain solid fine particles, and no hollow structure was held. The amount of Al (as calculated as $Al_2O_3$) contained in the chain solid fine particles was 9.4 parts by mass based on 100 parts by mass of $SiO_2$.

A coating film having a thickness of 100 nm was formed on a glass substrate in the same manner as in Example 1 except that the of the fine particles in Example 16 was used, and various evaluations were carried out. The results are shown in Table 1.

Example 17

To a 200 mL glass container, 5.25 g of the dispersion (solid content concentration: 20 mass %) of the hollow fine particles in Example 14, 9 g of a silicic acid oligomer solution (solid content concentration: 5 mass %) and 85.75 g of ethanol were added, followed by stirring for 10 minutes to obtain a coating composition (solid content concentration: 1.5 mass %).

A coating film having a thickness of 100 nm was formed on a glass substrate in the same manner as in Example 1 except that the coating composition in Example 17 was used, and various evaluations were carried out. The results are shown in Table 1.

Example 18

To a 200 mL glass container, 4.5 g of the dispersion (solid content concentration: 20 mass %) of the hollow fine particles in Example 14.12 g of a silicic acid oligomer solution (solid content concentration: 5 mass %) and 83.5 g of ethanol were added, followed by stirring for 10 minutes to obtain a coating composition (solid content concentration: 1.5 mass %).

A coating film having a thickness of 100 nm was formed on a glass substrate in the same manner as in Example 1 except that the coating composition in Example 18 was used, and various evaluations were carried out. The results are shown in Table 1.

Example 19

To a 200 mL glass container, 7.5 g of the dispersion (solid content concentration: 20 mass %) of the hollow fine particles in Example 14, and 92.5 g of ethanol were added, followed by stirring for 10 minutes to obtain a coating composition (solid content concentration: 1.5 mass %).

A coating film having a thickness of 100 nm was formed on a glass substrate in the same manner as in Example 1 except that the coating composition in Example 19 was used, and various evaluations were carried out. The results are shown in Table 1.

Example 20

To a 200 mL glass container, 6 g of the dispersion (solid content concentration: 20 mass %) of the hollow fine particles in Example 14, 6 g of a silicic acid oligomer solution (solid content concentration: 5 mass %), 0.016 g of aluminum acetylacetonate (0.20 part by mass as calculated as $Al_2O_3$ based on 100 parts by mass of hollow fine particles as calculated as $SiO_2$) and 87.984 g of ethanol were added, followed by stirring for 10 minutes to obtain a coating composition (solid content concentration: 1.5 mass %).

A coating film having a thickness of 100 nm was formed on a glass substrate in the same manner as in Example 1 except that the coating composition in Example 20 was used, and various evaluations were carried out. The results are shown in Table 1.

TABLE 1

| | Fine particles | | | | Coating composition | | | Minimum reflectance (%) | | |
|---|---|---|---|---|---|---|---|---|---|---|
| | | | As calculated as oxide (part by mass) | | | | | | | |
| | Additive compound | Other metal | Si | Other metal | Binder | Fine particles/binder (mass ratio) | Substrate | Initial | After abrasion | Δ refractive index |
| Ex. 1 | AlAA | Al | 100 | 0.20 | Silicic acid oligomer | 8/2 | Glass | 0.7 | 1.2 | 0.5 |
| Ex. 2 | AlAA | Al | 100 | 1.6 | Silicic acid oligomer | 8/2 | Glass | 0.8 | 1.0 | 0.2 |
| Ex. 3 | AlAA | Al | 100 | 8.0 | Silicic acid oligomer | 8/2 | Glass | 1.2 | 1.2 | 0 |
| Ex. 4 | CuAA | Cu | 100 | 3.0 | Silicic acid oligomer | 8/2 | Glass | 0.8 | 1.1 | 0.3 |
| Ex. 5 | CeAA | Ce | 100 | 3.0 | Silicic acid oligomer | 8/2 | Glass | 0.8 | 1.2 | 0.4 |
| Ex. 6 | DIPAIEA | Al | 100 | 3.4 | Silicic acid oligomer | 8/2 | Glass | 0.8 | 1.1 | 0.3 |
| Ex. 7 | AlAA | Al | 100 | 1.6 | Silicic acid oligomer | 7/3 | Glass | 1.0 | 1.1 | 0.1 |
| Ex. 8 | AlAA | Al | 100 | 1.6 | Silicic acid oligomer | 6/4 | Glass | 1.2 | 1.2 | 0 |
| Ex. 9 | AlAA | Al | 100 | 1.6 | — | 10/0 | Glass | 0.5 | 0.9 | 0.4 |
| Ex. 10 | AlAA | Al | 100 | 1.6 | Silicic acid oligomer | 8/2 | PET | 0.7 | 1.1 | 0.4 |
| Ex. 11 | ZrAA | Zr | 100 | 2.8 | Silicic acid oligomer | 8/2 | Glass | 0.8 | 1.1 | 0.3 |

TABLE 1-continued

| | Fine particles | | | | Coating composition | | | Minimum reflectance (%) | | |
|---|---|---|---|---|---|---|---|---|---|---|
| | | As calculated as oxide (part by mass) | | | | Fine particles/binder | | | After | Δ refractive |
| | Additive compound | Other metal | Si | Other metal | Binder | (mass ratio) | Substrate | Initial | abrasion | index |
| Ex. 12 | ZrAA | Zr | 100 | 2.8 | Silicic acid oligomer | 7/3 | Glass | 1.0 | 1.2 | 0.2 |
| Ex. 13 | ZrAA | Zr | 100 | 2.8 | Silicic acid oligomer | 6/4 | Glass | 1.2 | 1.3 | 0.1 |
| Ex. 14 | — | — | 100 | 0 | Silicic acid oligomer | 8/2 | Glass | 0.7 | 1.7 | 1.0 |
| Ex. 15 | AlAA | Al | 100 | 0.03 | Silicic acid oligomer | 8/2 | Glass | 0.7 | 1.7 | 1.0 |
| Ex. 16 | AlAA | Al | 100 | 9.4 | Silicic acid oligomer | 8/2 | Glass | 2.0 | 2.0 | 0 |
| Ex. 17 | — | — | 100 | 0 | Silicic acid oligomer | 7/3 | Glass | 0.9 | 1.8 | 0.8 |
| Ex. 18 | — | — | 100 | 0 | Silicic acid oligomer | 6/4 | Glass | 1.1 | 1.7 | 0.6 |
| Ex. 19 | — | — | 100 | 0 | — | 10/0 | Glass | 0.4 | 4.6 | 4.2 |
| Ex. 20 | — | — | 100 | 0 | Silicic acid oligomer + AlAA | 8/2 | Glass | 0.8 | 1.6 | 0.8 |

AlAA: Aluminum acetylacetonate,
CuAA: copper acetylacetonate,
CeAA: cerium acetylacetonate trihydrate,
DIPAIEA: diisopropoxyaluminum ethyl acetate,
ZrAA: zirconium acetylacetonate The coating film of the article in each of Examples 1 to 13 comprised a coating composition wherein the total amount of other metal (as calculated as oxide) contained in the hollow fine particles and other metal (as calculated as oxide) contained in the chain solid fine particles is from 0.2 to 8 parts by mass based on 100 parts by mass of the total amount of $SiO_2$ contained in the hollow fine particles and $SiO_2$ contained in the chain solid fine particles, and accordingly the reflectance before abrasion of the coating film was sufficiently low, thus indicating a high antireflection effect. Further, the change in the reflectance by abrasion was small, thus indicating high film strength. Further, the dispersion of the hollow fine particles in each of Examples 1 to 13 was diluted to 0.1 mass % with ethanol and then sampled on a collodion membrane and observed by a transmission electron microscope, whereupon such a structure was formed that the hollow fine particles were mutually connected by the chain solid fine particles. It is considered that when such a structure is formed, excellent adhesion properties of the coating film to a substrate are obtained, and such contributes to a small change in the reflectance by abrasion as a result.

With respect to the article in each of Examples 14 and 17 to 19 wherein hollow fine particles comprising $SiO_2$ alone, containing no other metal, were used, although the reflectance before abrasion of the coating film was sufficiently low and the antireflection effect was high, the change in the reflectance by abrasion was significant, and the film strength was insufficient.

With respect to the article in Example 15 wherein hollow fine particles with a small amount of other metal were used, although the reflectance before abrasion of the coating film was sufficiently low and the antireflection effect was high, the change in the reflectance by abrasion was significant, and the film strength was insufficient.

With respect to the article in Example 16 wherein fine particles with a large amount of other metal were used, most of the fine particles were chain solid fine particles and no hollow structure was held, and accordingly the reflectance before abrasion was high, and the antireflection effect was insufficient. On the other hand, the change in the reflectance by abrasion was small, and the film strength was high.

With respect to the article in Example 20 wherein hollow fine particles comprising $SiO_2$ alone, containing no other metal, were used, and other metal was added to the binder, although the reflectance before abrasion of the coating film was sufficiently low and the antireflection effect was high, the change in the reflectance by abrasion was significant, and the film strength was insufficient.

Industrial Applicability

The article having the coating film comprising the coating composition of the present invention formed thereon is useful as e.g. a transparent component for vehicles (such as a head light cover, a side mirror, a front transparent substrate, a side transparent substrate or a rear transparent substrate), a transparent component for vehicles (such as an instrument panel surface), a meter, a building window, a show window, a display (such as a notebook computer, a monitor, LCD, PDP, ELD, CRT or PDA), a LCD color filter, a substrate for a touch panel, a pickup lens, an optical lens, a lens for glasses, a camera component, a video component, a cover substrate for CCD, an optical fiber edge face, a projector component, a copying machine component, a transparent substrate for solar cells, a screen of a cell-phone, a backlight unit component (such as a light guide plate or a cold-cathode tube), a backlight unit component liquid crystal brightness-improving film (such as a prism or a semi-transmissive film), a liquid crystal brightness-improving film, an organic EL light emitting device component, an inorganic EL light emitting device component, a phosphor light emitting device component, an optical filter, an edge face of an optical component, an illuminating lamp, a cover for a light filament, an amplified laser light source, an antireflection film, a polarizing film, an agricultural film, etc.

The entire disclosure of Japanese Patent Application No. 2007-068595 filed on Mar. 16, 2007 including specification, claims, drawings and summary is incorporated herein by reference in its entirety.

What is claimed is:

1. Hollow fine particles comprising $SiO_2$ as the main component and comprising an other metal, wherein
the amount of the other metal (as calculated as oxide) is from 0.2 to 8 parts by mass based on 100 parts by mass of $SiO_2$, and
the hollow fine particles are mutually connected by chain solid fine particles comprising $SiO_2$ as the main component and comprising the other metal.

2. The hollow fine particles of claim 1, wherein the other metal is at least one metal selected from the group consisting of Al, Cu, Ce, Sn, Ti, Cr, Co, Fe, Mn, Ni, Zn and Zr.

3. A coating composition comprising the hollow fine particles of claim 1 and a dispersion medium.

4. The coating composition of claim 3, wherein the chain solid fine particles comprise from 0.2 to 8 parts by mass of the other metal (as calculated as oxide) based on 100 parts by mass of the total amount of $SiO_2$ in the chain solid fine particles.

5. The coating composition of claim 3, further comprising a binder.

6. An article comprising a substrate and a coating film, wherein
the coating film comprises the coating composition of claim 3, and
the coating film is disposed on the substrate.

7. A process for producing the hollow fine particles of claim 1, the process comprising:
(a) in a dispersion comprising a $SiO_2$ precursor material, core fine particles, and at least one compound selected from the group consisting of a metal chelate compound, an organic tin compound, a metal alcoholate and a metal fatty acid salt, precipitating a shell comprising $SiO_2$ as the main component and comprising the other metal on the surface of each core fine particle to obtain core/shell particles, and
(b) dissolving or decomposing the core fine particles of the core/shell particles, to obtain the hollow fine particles.

8. The process of claim 7, wherein the $SiO_2$ precursor material is silicic acid, a silicate or a hydrolysable silane.

9. The hollow fine particles of claim 1, comprising at least 90 mass% of $SiO_2$, based on the mass of the hollow fine particles.

10. The hollow fine particles of claim 1, wherein the amount of the other metal (as calculated as oxide) is from 0.5 to 5 parts by mass based on 100 parts by mass of $SiO_2$.

11. The hollow fine particles of claim 1, having an average primary particle size of 5 to 100 nm.

12. The hollow fine particles of claim 1, having an average primary particle size of 5 to 50 nm.

13. The hollow fine particles of claim 1, having a refractive index of 1.1 to 1.4.

14. The hollow fine particles of claim 1, having a refractive index of 1.2 to 1.35.

15. The hollow fine particles of claim 1, wherein the chain solid fine particles comprise at least 90 mass% of $SiO_2$, based on the mass of the chain solid fine particles.

16. The hollow fine particles of claim 1, wherein the chain solid fine particles comprise 0.2 to 8 parts by mass of the other metal, based on 100 parts by mass of $SiO_2$.

17. The hollow fine particles of claim 1, wherein the chain solid fine particles comprise 0.5 to 5 parts by mass of the other metal, based on 100 parts by mass of $SiO_2$.

18. The hollow fine particles of claim 1, wherein an aspect ratio of the chain solid fine particles is in a range of 2 to 10.

19. The hollow fine particles of claim 1, wherein an aspect ratio of the chain solid fine particles is in a range of 5 to 10.

20. The hollow fine particles of claim 1, wherein an average length of the chain solid fine particles in an extended direction is 2 to 500 nm.

* * * * *